US012761581B2

(12) United States Patent
Kusuda et al.

(10) Patent No.: US 12,761,581 B2
(45) Date of Patent: Oct. 13, 2026

(54) METHOD OF RECYCLING DEVELOPING CARTRIDGE HAVING HOLDER ASSEMBLY MOUNTED ON GEAR COVER WITH SCREW

(71) Applicant: BROTHER KOGYO KABUSHIKI KAISHA, Nagoya (JP)

(72) Inventors: Shinya Kusuda, Nagoya (JP); Yasuo Fukamachi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/791,855

(22) Filed: Aug. 1, 2024

(65) Prior Publication Data

US 2024/0393717 A1 Nov. 28, 2024

Related U.S. Application Data

(63) Continuation of application No. PCT/JP2023/002621, filed on Jan. 27, 2023.

(30) Foreign Application Priority Data

Feb. 1, 2022 (JP) ................................ 2022-014344

(51) Int. Cl.
*G03G 15/08* (2006.01)
*G03G 21/16* (2006.01)
*G03G 21/18* (2006.01)

(52) U.S. Cl.
CPC ..... *G03G 15/0894* (2013.01); *G03G 15/0875* (2013.01); *G03G 21/16* (2013.01);
(Continued)

(58) Field of Classification Search
CPC ........... G03G 15/0894; G03G 15/0875; G03G 2215/00987; G03G 21/12; G03G 21/16;
(Continued)

(56) References Cited

U.S. PATENT DOCUMENTS

2007/0086806 A1* 4/2007 Burchette .......... G03G 21/1878
399/109
2012/0200871 A1* 8/2012 Takahashi .............. G03G 21/00
358/1.9
(Continued)

FOREIGN PATENT DOCUMENTS

CN 119644692 A * 3/2025 ......... G03G 21/1878
EP 3287854 A1 * 2/2018 ......... G03G 21/1676
(Continued)

OTHER PUBLICATIONS

International Preliminary Report on Patentability issued in corresponding International Application No. PCT/JP2023/002621, Aug. 6, 2024.

(Continued)

*Primary Examiner* — Arlene Heredia Ocasio
*Assistant Examiner* — Laura Roth
(74) *Attorney, Agent, or Firm* — Merchant & Gould P.C.

(57) ABSTRACT

Provided is a method of recycling a developing cartridge including a housing, a gear cover, a holder assembly, and a first screw. The method includes: a gear cover removing step of removing the gear cover having the holder assembly from the housing; a screw removing step of removing the first screw from the gear cover; a holder assembly removing step of removing the holder assembly from the gear cover; a first gear cover mounting step of mounting the gear cover on a jig; a holder assembly mounting step of mounting another holder assembly on the gear cover with the first screw; and a second gear cover mounting step of mounting the gear cover having the another holder assembly on the housing. In the first gear cover mounting step, another storage medium holder of the another holder assembly is restricted from moving relative to another holder cover thereof and the jig.

11 Claims, 16 Drawing Sheets

(52) U.S. Cl.
CPC ....... *G03G 21/181* (2013.01); *G03G 21/1878* (2013.01); *G03G 21/1885* (2013.01); *G03G 2215/00987* (2013.01); *G03G 2221/1823* (2013.01)

(58) Field of Classification Search
CPC ...... G03G 21/18; G03G 21/181; G03G 15/08; G03G 21/1878; G03G 21/1885; G03G 2221/1823; G03G 15/757; G03G 21/1857
See application file for complete search history.

(56) References Cited

U.S. PATENT DOCUMENTS

| | | | | |
|---|---|---|---|---|
| 2014/0133883 | A1 | 5/2014 | Martin et al. | |
| 2020/0125007 | A1 | 4/2020 | Yokoi | |
| 2021/0311410 | A1 | 10/2021 | Kusuda et al. | |
| 2021/0311429 | A1 | 10/2021 | Itabashi et al. | |
| 2022/0082991 | A1* | 3/2022 | Tosuji ................ | G03G 21/1647 |
| 2022/0082992 | A1* | 3/2022 | Tosuji ................ | G03G 21/1652 |

FOREIGN PATENT DOCUMENTS

| | | | |
|---|---|---|---|
| JP | 2015-129813 | A | 7/2015 |
| JP | 2019-008091 | A | 1/2019 |
| JP | 2021-162749 | A | 10/2021 |
| JP | 2021-162755 | A | 10/2021 |

OTHER PUBLICATIONS

International Search Report issued in related PCT /JP2023/002621, Mar. 14, 2023.

* cited by examiner

METHOD OF RECYCLING DEVELOPING CARTRIDGE HAVING HOLDER ASSEMBLY MOUNTED ON GEAR COVER WITH SCREW

REFERENCE TO RELATED APPLICATIONS

This application is a continuation application of International Application No. PCT/JP2023/002621 filed on Jan. 27, 2023, which claims priority from Japanese Patent Application No. 2022-014344 filed on Feb. 1, 2022. The entire contents of the aforementioned applications are incorporated herein by reference.

BACKGROUND ART

A prior art reference describes a developing cartridge that can be mounted on a drum cartridge. The developing cartridge has an IC chip, which is a storage medium; an IC chip holder that holds the IC chip; and a holder cover that holds the IC chip holder. The IC chip stores various information about the developing cartridge (for example, information on the service life of components such as a developing roller). The holder cover is fixed to a gear cover. Further, the gear cover is fixed to an end of a casing that can store toner.

SUMMARY

In recent years, some developing cartridges have been recycled from the standpoint of promoting environmental protection and the sustainable use of resources. To recycle a developing cartridge, the developing cartridge is disassembled and necessary maintenance is performed, such as replacing or cleaning parts in the developing cartridge. For example, the IC chip, IC chip holder, and holder cover in the developing cartridge may be replaced when recycling the cartridge.

However, when an operator replaces the IC chip, IC chip holder, and holder cover in a developing cartridge, the IC chip holder could move relative to the holder cover.

Consequently, the operator may have difficulty in fixing the holder cover to the gear cover while the holder cover retains the IC chip holder. Therefore, a technology is needed for facilitating the operator's mounting of a holder cover retaining an IC chip holder on a gear cover in recycling a developing cartridge.

In view of the foregoing, it is an object of the present disclosure is to provide a technique for facilitating mounting of a holder cover holding an IC chip holder on a gear cover in recycling of a developing cartridge.

In order to attain the above and other object, according to one aspect, the present disclosure provides a method of recycling a developing cartridge including: a housing configured to store developer therein; a gear cover positioned at one end of the housing in a first direction; a holder assembly; and a first screw for mounting the holder assembly on the gear cover. The holder assembly includes: a storage medium; a storage medium holder holding the storage medium, the storage medium holder being movable relative to the housing and the gear cover; and a holder cover holding the storage medium holder. The method includes: a gear cover removing step of removing the gear cover having the holder assembly mounted thereon with the first screw from the housing; a screw removing step of removing, after the gear cover removing step, the first screw from the gear cover; a holder assembly removing step of removing, after the screw removing step, the holder assembly from the gear cover; a first gear cover mounting step of mounting, after the holder assembly removing step, the gear cover on a jig on which another holder assembly different from the removed holder assembly is mounted; a holder assembly mounting step of mounting, after the first gear cover mounting step, the another holder assembly on the gear cover with the first screw; and a second gear cover mounting step of mounting, after the holder assembly mounting step, the gear cover having the another holder assembly mounted thereon with the first screw on the housing. The another holder assembly includes another storage medium holder and another holder cover. In the first gear cover mounting step, the another storage medium holder of the another holder assembly is restricted from moving relative to the jig and the anther holder cover of the another holder assembly in a state where the another holder assembly is mounted on the jig.

According to the method of recycling the developing cartridge of the one aspect, movement of the storage medium holder relative to the jig and the holder cover is restricted in a state where the another holder assembly is mounted on the jig. Therefore, the holder cover holding the storage medium holder can be easily mounted on the gear cover.

According to another aspect, the present disclosure also provides a method of recycling a developing cartridge including: a housing configured to store developer therein; a gear cover positioned at one end of the housing in a first direction; a holder assembly; and a first screw for mounting the holder assembly on the gear cover. The holder assembly includes: a storage medium having an electrical contact surface; a storage medium holder holding the storage medium, the storage medium holder being movable relative to the housing and the gear cover; and a holder cover holding the storage medium holder. The method includes: a first gear cover removing step of removing the gear cover having the holder assembly mounted thereon with the first screw from the housing; a first holder assembly mounting step of mounting, after the first gear cover removing step, the holder assembly mounted on the gear cover with the first screw on a jig; a screw removing step of removing, after the first holder assembly mounting step, the first screw from the gear cover; and a second gear cover removing step of removing, after the screw removing step, the gear cover from the holder assembly while leaving the holder assembly on the jig. In the first holder assembly mounting step, the storage medium holder of the holder assembly is restricted from moving relative to the jig and the holder cover of the holder assembly in a state where the holder assembly is mounted on the jig.

According to the method of recycling the developing cartridge of the another aspect, movement of the storage medium holder relative to the jig and the holder cover is restricted in a state where the another holder assembly is mounted on the jig. Therefore, the holder cover holding the storage medium holder can be easily mounted on the gear cover.

DESCRIPTION

Figure 1:
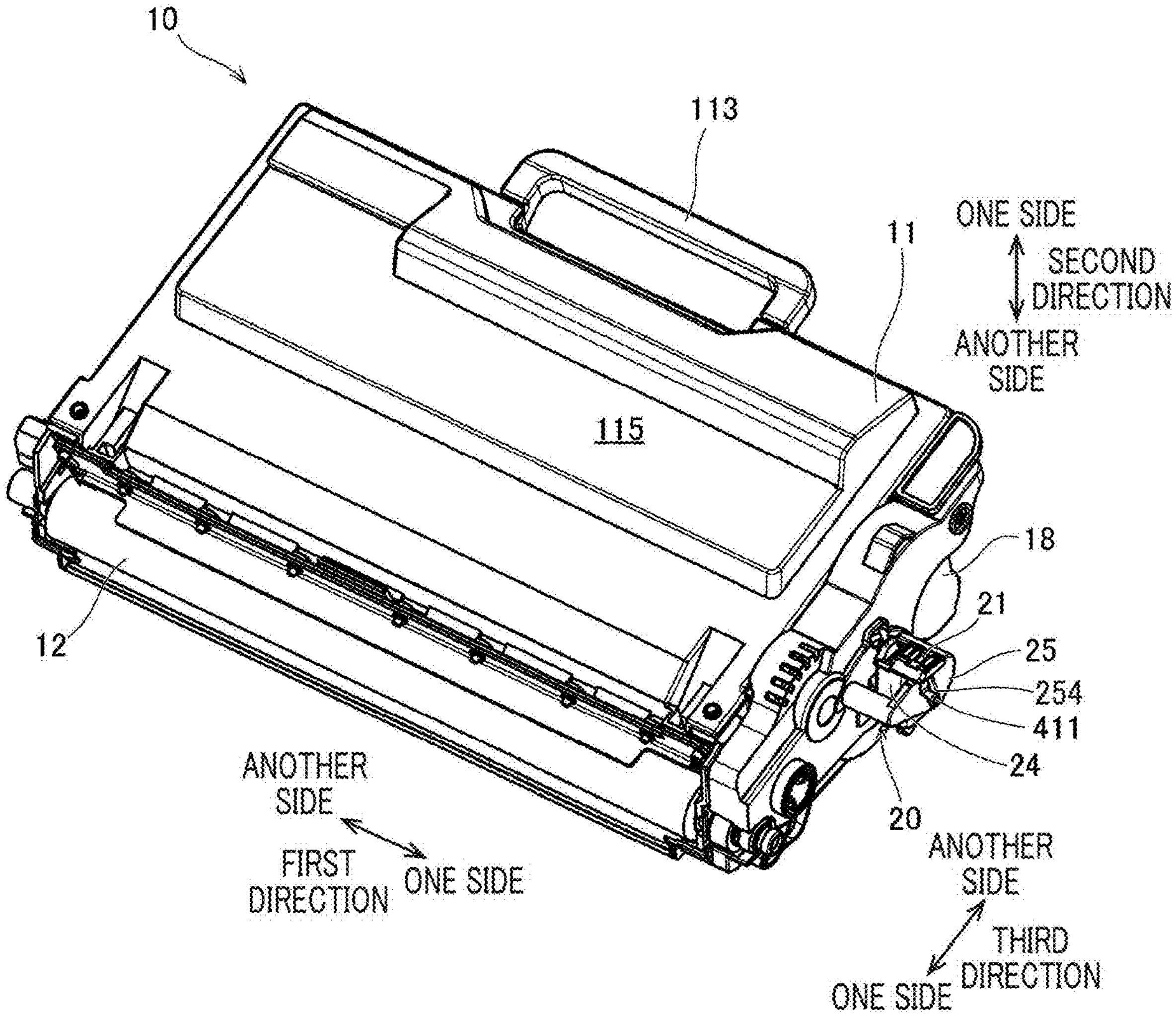
FIG. 1 is a perspective view of a developing cartridge according to the embodiment.

Hereinafter, an embodiment of the present disclosure will be described while referring to accompanying drawings. Incidentally, the components described in this embodiment are merely examples, and the scope of this disclosure is not intended to be limited to these examples. In the drawings, dimensions and numbers of components may be simplified as necessary for facilitating understanding.

1. Embodiment

Figure 2:
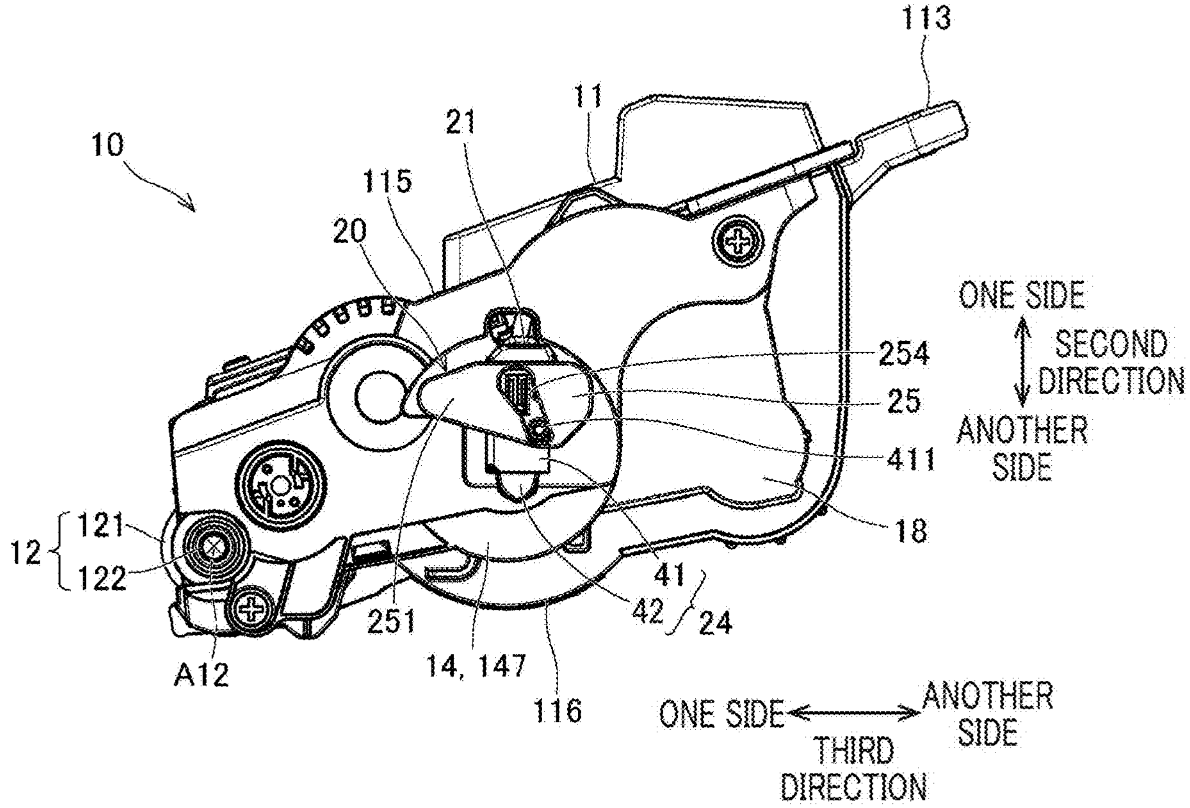
FIG. 2 is a side view of the developing cartridge according to the embodiment.
Figure 3:
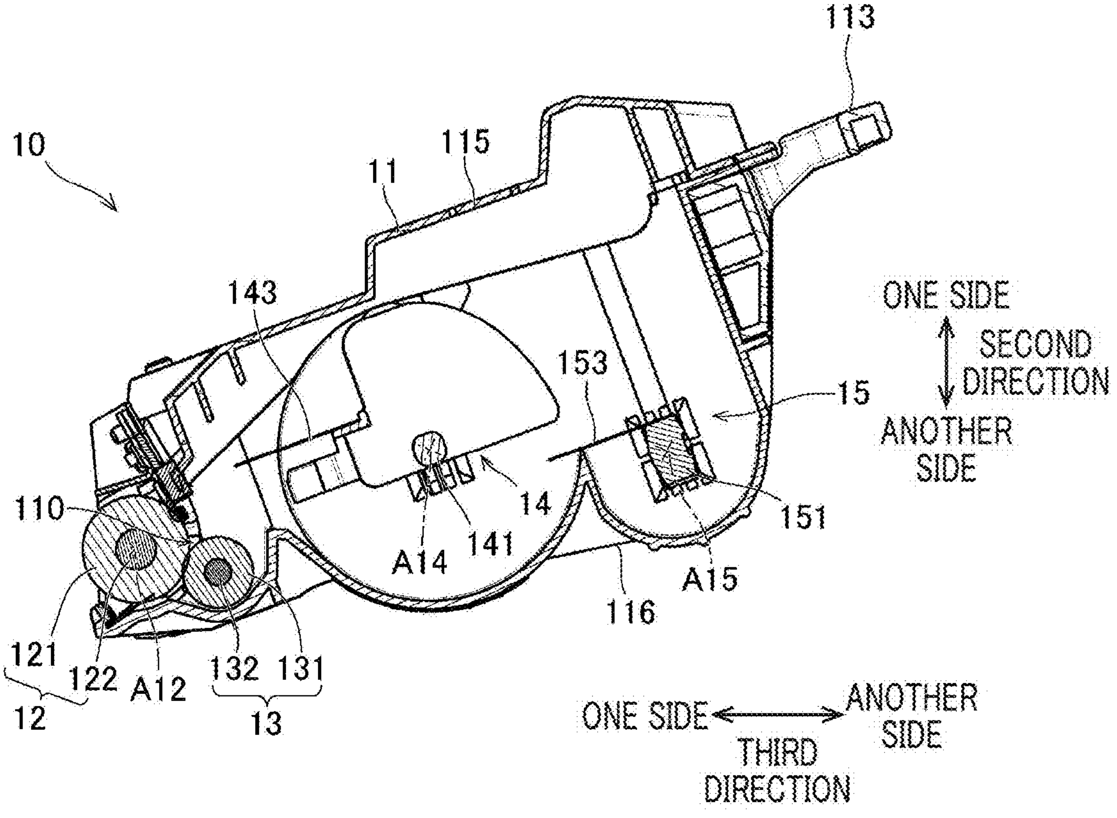
FIG. 3 is a central cross-sectional view of the developing cartridge according to the embodiment.
Figure 4:
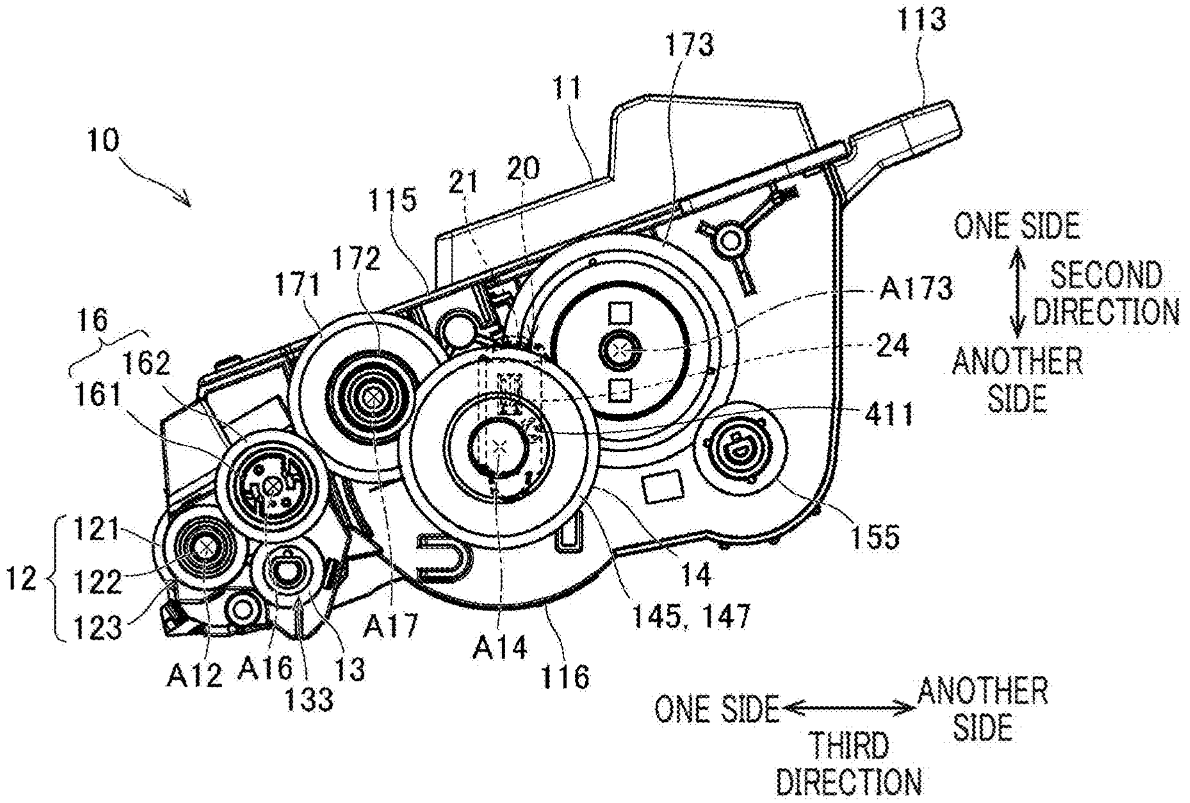
FIG. 4 is a side view illustrating the developing cartridge in a state where a gear cover is removed.
Figure 5:
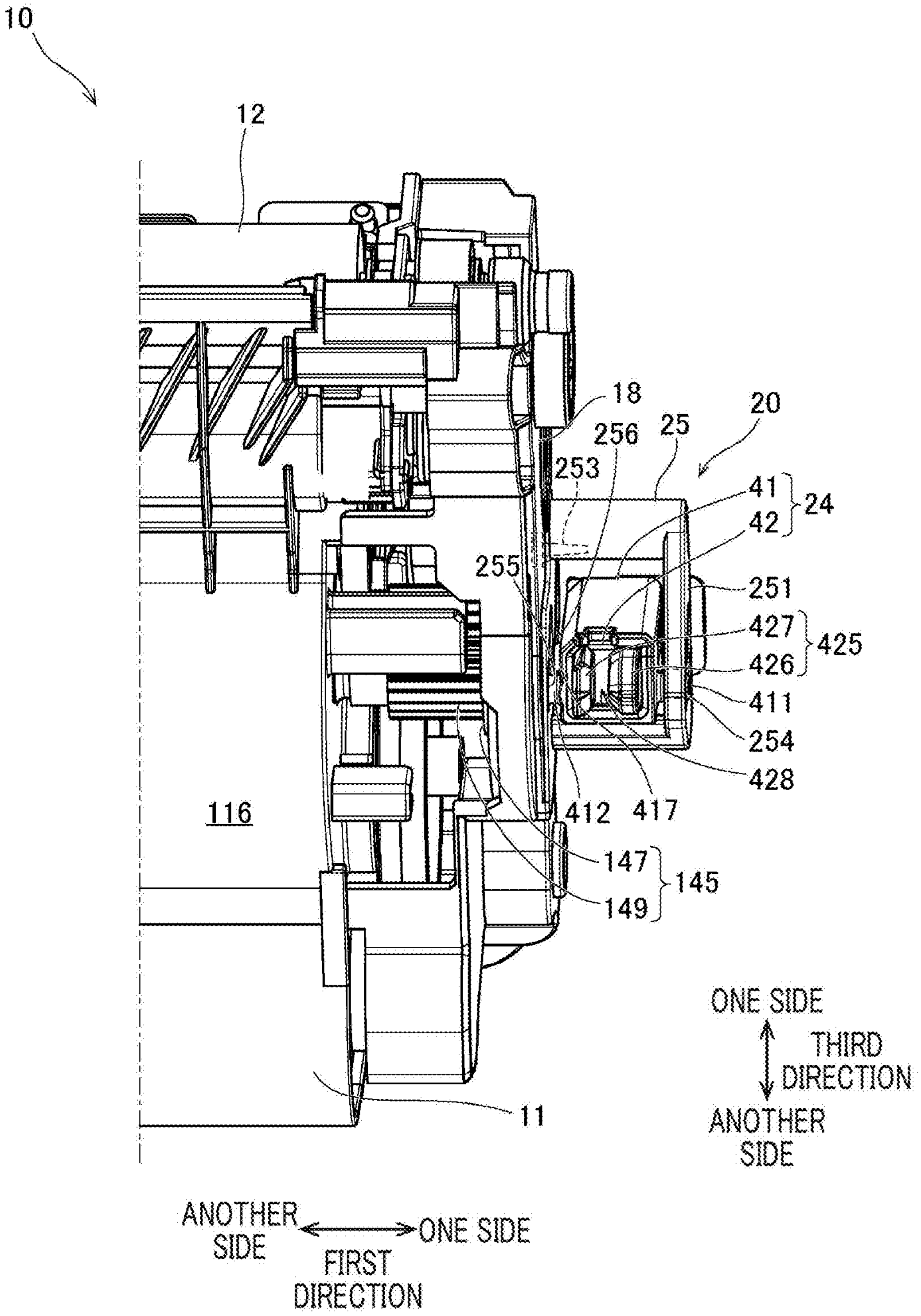
FIG. 5 is a bottom view illustrating one end of the developing cartridge in a first direction.
Figure 6:
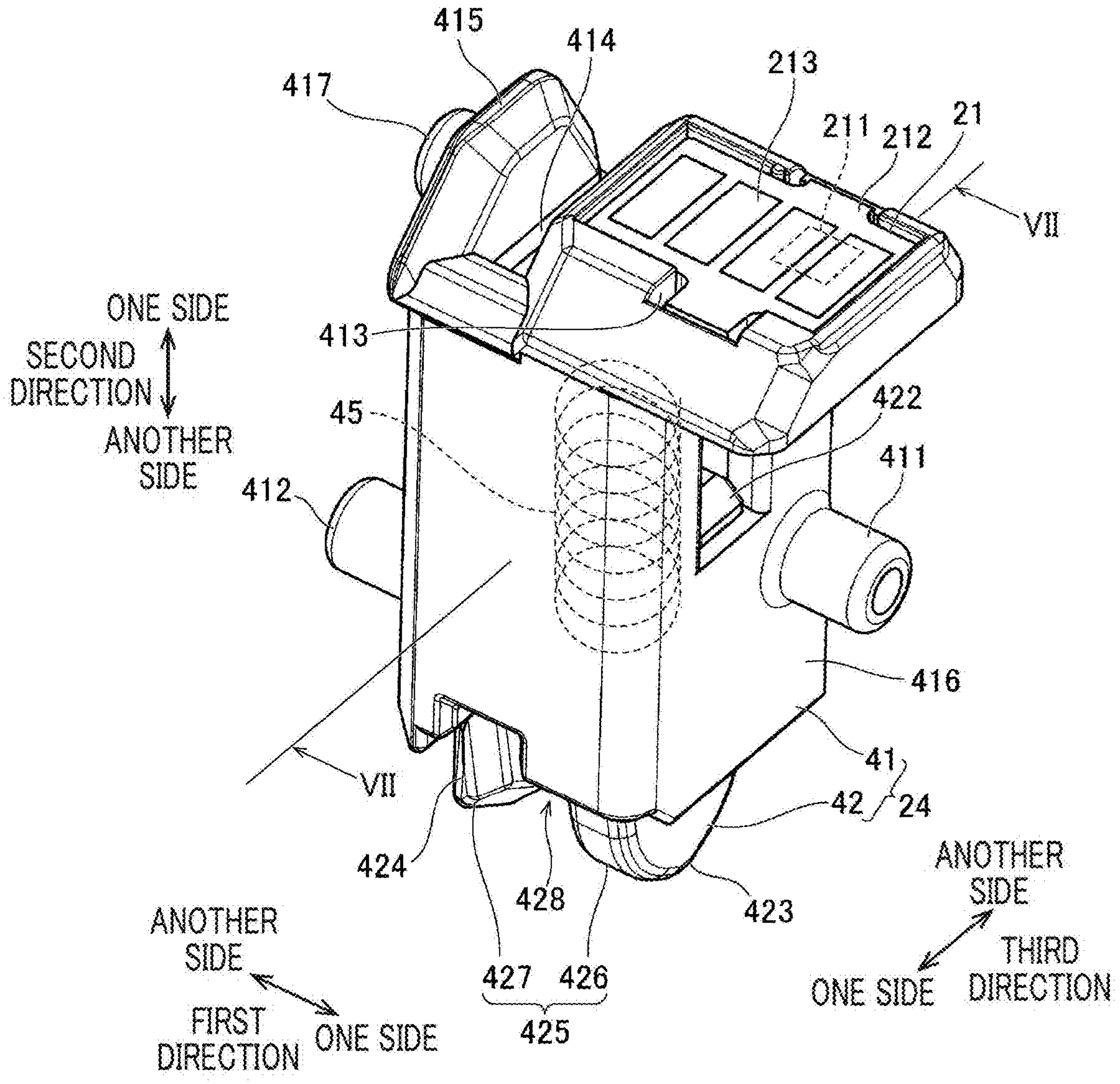
FIG. 6 is a perspective view of an IC chip holder according to the embodiment.
Figure 7:
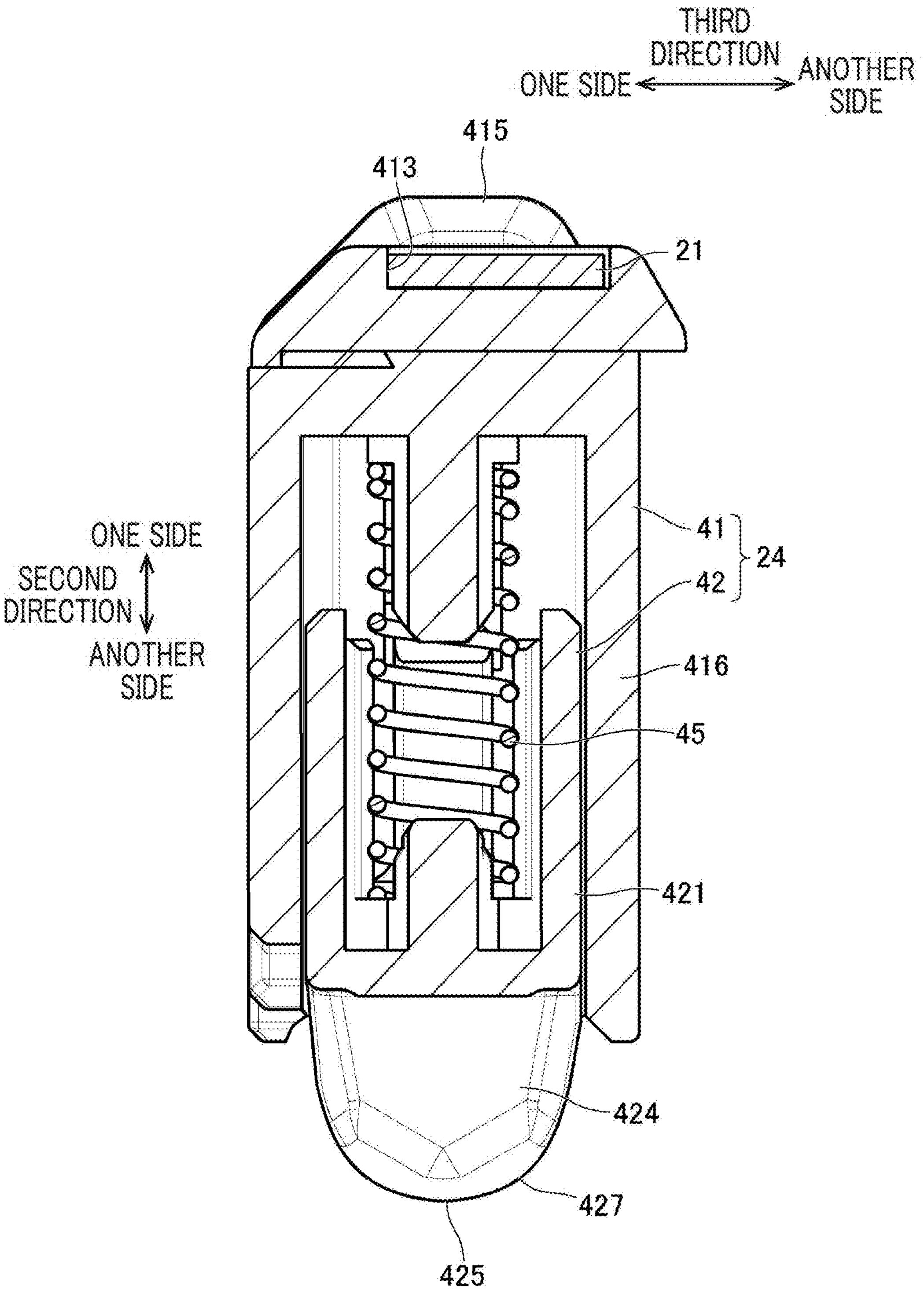
FIG. 7 is a cross-sectional view of the IC chip holder taken along a line VII-VII shown in FIG. 6.

FIG. 1 is a perspective view of a developing cartridge 10 according to the embodiment. FIG. 2 is a side view of the developing cartridge 10 illustrated in FIG. 1. FIG. 3 is a central cross-sectional view of the developing cartridge 10 illustrated in FIG. 1. FIG. 4 is a side view illustrating the developing cartridge 10 in a state where a gear cover 18 is removed. FIG. 5 is a bottom view illustrating one end of the developing cartridge 10 in a first direction. FIG. 6 is a perspective view of an IC chip holder 24 according to the embodiment. FIG. 7 is a cross-sectional view of the IC chip holder 24 taken along a line VII-VII shown in FIG. 6.

Hereinafter, a direction in which a developing roller axis A12 of a developing roller 12 in the developing cartridge 10 extends will be called "first direction." A direction crossing a first electrical contact surface 213 provided in the developing cartridge 10 will be called "second direction." A direction in which the developing roller 12 and a first agitator 14 (FIG. 3) are aligned will be called "third direction." The first, second, and third directions all cross each other and, are preferably all orthogonal to each other.

As illustrated in FIG. 1, the developing cartridge 10 includes a housing 11, the developing roller 12, a supply roller 13, the first agitator 14, and a second agitator 15.

<Housing 11>

The housing 11 can accommodate developer therein. The developer is toner, for example. The housing 11 extends in the first direction. The housing 11 has an opening 110 (see FIG. 3). The opening 110 is positioned at one end of the housing 11 in the third direction. The housing 11 has a first handle 113. The first handle 113 is positioned at another end of the housing 11 in the third direction. The housing 11 has a first outer surface 115, and a second outer surface 116. The first outer surface 115 is positioned at one end of the housing 11 in the second direction. The second outer surface 116 is positioned at another end of the housing 11 in the second direction.

<Developing Roller 12>

The developing roller 12 is rotatable about the developing roller axis A12 in a state where the developing cartridge 10 is attached to a body of a printer. The developing roller axis A12 extends in the first direction. The developing roller 12 is positioned in the opening 110. In other words, the developing roller 12 is positioned at the one end of the housing 11 in the third direction. In a state where the developing cartridge 10 is attached to the printer body, the developing roller 12 supplies the developer in the housing 11 onto a surface of a photosensitive drum (not illustrated).

The developing roller 12 includes a developing roller body 121, and a developing roller shaft 122. The developing roller body 121 has a cylindrical shape that extends in the first direction. The developing roller body 121 is configured of an electrically-conductive rubber, for example.

The developing roller shaft 122 has a columnar shape that extends along the developing roller axis A12. The developing roller shaft 122 is made of metal, for example. The developing roller shaft 122 is positioned radially inside the developing roller body 121. The developing roller shaft 122 penetrates through the developing roller body 121 in the first direction. Incidentally, the developing roller shaft 122 need not penetrate the developing roller body 121, but may be mounted in both ends of the developing roller body 121. The developing roller 12 is rotatable about an axis of the developing roller shaft 122.

<Supply Roller 13>

The supply roller 13 supplies the developer within the housing 11 onto a surface of the developing roller 12. The supply roller 13 is positioned inside the housing 11. The supply roller 13 contacts the developing roller 12. The supply roller 13 is rotatable about a supply roller axis. The supply roller axis extends in the first direction.

As illustrated in FIG. 3, the supply roller 13 includes a supply roller body 131, and a supply roller shaft 132. The supply roller body 131 has a cylindrical shape that extends in the first direction. The supply roller body 131 is configured of an electrically-conductive sponge, for example. The supply roller body 131 contacts the developing roller body 121.

<First Agitator 14>

The first agitator 14 can agitate developer. As illustrated in FIG. 3, the first agitator 14 is positioned inside the housing 11. The first agitator 14 is rotatable about an agitator axis A14. The agitator axis A14 extends in the first direction. As illustrated in FIG. 3, the first agitator 14 includes an agitator shaft 141, and a film 143.

The agitator shaft 141 extends along the agitator axis A14. The film 143 is coupled to the agitator shaft 141. The agitator shaft 141 and film 143 are rotatable about the agitator axis A14. By rotating, the film 143 agitates the developer inside the housing 11. The film 143 is made of resin.

<Second Agitator 15>

The second agitator 15 can agitate developer. As illustrated in FIG. 3, the second agitator 15 is positioned inside the housing 11. The second agitator 15 is positioned on an opposite side of the first agitator 14 from the developing roller 12 in the third direction. The second agitator 15 is rotatable about an agitator axis A15. The agitator axis A15 extends in the first direction. The second agitator 15 includes an agitator shaft 151, and a film 153.

The agitator shaft 151 extends along the agitator axis A15. The film 153 is coupled to the agitator shaft 151. The agitator shaft 151 and film 153 are rotatable about the agitator axis A15. By rotating, the film 153 agitates the developer inside the housing 11. The film 153 is made of resin, for example.

As illustrated in FIGS. 2 and 4, the developing cartridge 10 further includes a developing coupling 16, a developing roller gear 123, a supply roller gear 133, a first idle gear 171, a second idle gear 172, a third idle gear 173, a first agitator gear 145, a second agitator gear 155, the gear cover 18, and a holder assembly 20.

As illustrated in FIG. 4, the developing coupling 16 is positioned at one end of the housing 11 in the first direction. The developing coupling 16 is positioned between the developing roller 12 and the first agitator 14 in the third direction. The developing coupling 16 is rotatable about a coupling axis A16. The coupling axis A16 extends in the first direction. The developing coupling 16 has a coupling part 161, and a coupling gear 162. The coupling part 161 and coupling gear 162 may be integral or separate parts. The coupling part 161 has a coupling hole that is recessed in the first direction.

In a state where the developing cartridge 10 is attached to the printer body (not illustrated), the coupling part 161 receives power from the printer body. When engaged with a device-side coupling (not illustrated) of the printer body, the coupling part 161 can rotate together with the device-side coupling about the coupling axis A16. The coupling part 161 has a cylindrical shape that extends in the first direction. The coupling gear 162 is positioned at the one end of the housing 11 in the first direction. The coupling gear 162 can rotate together with the coupling part 161.

<Developing Roller Gear 123>

As illustrated in FIG. 4, the developing roller gear 123 is positioned at the one end of the housing 11 in the first direction. The developing roller gear 123 is attached to the developing roller shaft 122 and is rotatable together with the developing roller shaft 122. The developing roller gear 123 meshes with the coupling gear 162.

<Supply Roller Gear 133>

As illustrated in FIG. 4, the supply roller gear 133 is positioned at the one end of the housing 11 in the first direction. The supply roller gear 133 is attached to the supply roller shaft 132 and is rotatable together with the supply roller shaft 132. The supply roller gear 133 meshes with the coupling gear 162.

<First Idle Gear 171>

As illustrated in FIG. 4, the first idle gear 171 is positioned at the one end of the housing 11 in the first direction. The first idle gear 171 is positioned between the second idle gear 172 and the housing 11 in the first direction. The first idle gear 171 is rotatable about an idle axis A17 extending in the first direction. The first idle gear 171 meshes with the coupling gear 162.

<Second Idle Gear 172>

As illustrated in FIG. 4, the second idle gear 172 is positioned at the one end of the housing 11 in the first direction. The second idle gear 172 is positioned farther from the housing 11 in the first direction than the first idle gear 171 is from the housing 11 in the first direction. The second idle gear 172 is positioned on an opposite side of the first idle gear 171 from the one end of the housing 11 in the first direction. The second idle gear 172 has a diameter that is smaller than a diameter of the first idle gear 171. The first idle gear 171 is rotatable together with the second idle gear 172 about the idle axis A17. The first idle gear 171 and second idle gear 172 rotate together. The first idle gear 171 and second idle gear 172 may be formed integrally or separately from each other.

<Third Idle Gear 173>

As illustrated in FIG. 4, the third idle gear 173 is positioned at the one end of the housing 11 in the first direction. The third idle gear 173 is positioned between a small-diameter gear 149 (see FIG. 5) of the first agitator gear 145 described later and the second agitator gear 155 in the third direction. The third idle gear 173 is rotatable about an idle axis A173. The third idle gear 173 meshes with the small-diameter gear 149 of the first agitator gear 145.

<First Agitator Gear 145>

As illustrated in FIG. 4, the first agitator gear 145 is positioned at the one end of the housing 11 in the first direction. The first agitator gear 145 is attached to the agitator shaft 141 of the first agitator 14. The first agitator gear 145 is rotatable together with the first agitator 14 about the agitator axis A14.

The first agitator gear 145 has a large-diameter gear 147, and the small-diameter gear 149. The small-diameter gear 149 has a diameter that is smaller than a diameter of the large-diameter gear 147. As illustrated in FIG. 5, the small-diameter gear 149 is positioned between the large-diameter gear 147 and the housing 11 in the first direction. In other words, the large-diameter gear 147 is positioned on an opposite side of the small-diameter gear 149 from the housing 11 in the first direction.

<Second Agitator Gear 155>

As illustrated in FIG. 4, the second agitator gear 155 is positioned at the one end of the housing 11 in the first direction. The second agitator gear 155 is attached to the agitator shaft 151 of the second agitator 15. The second agitator gear 155 can rotate together with the second agitator 15 about the agitator axis A15. The second agitator gear 155 meshes with the third idle gear 173.

<Gear Cover 18>

As illustrated in FIGS. 2 and 4, the gear cover 18 covers the coupling gear 162, supply roller gear 133, first idle gear 171, second idle gear 172, third idle gear 173, first agitator gear 145, and second agitator gear 155. Incidentally, the gear cover 18 may cover just some of the gears and need not cover all gears. The gear cover 18 is mounted on the one end of the housing 11 in the first direction by screws or the like.

<Holder Assembly 20>

The holder assembly 20 includes an IC chip 21, an IC chip holder 24, and a holder cover 25. As illustrated in FIGS. 1 and 2, the holder assembly 20 is positioned at one end of the gear cover 18 in the first direction.

<IC Chip 21>

The IC chip 21 is an example of a "storage medium." As illustrated in FIG. 6, the IC chip 21 has a developing memory 211, an IC substrate 212, and first electrical contact surfaces 213. The developing memory 211 stores various information on the developing cartridge 10. For example, the developing memory 211 stores ID information, and service life information. The ID information is information for identifying an individual developing cartridge 10. Specifically, the ID information is a serial number. The service life information includes the cumulative number of rotations of the developing roller 12, the cumulative number of sheets printed using the developing roller 12, and the cumulative number of dots printed using the developing roller 12, for example.

The IC substrate 212 is positioned at one end of the IC chip holder 24 in the second direction. The IC substrate 212 is a plate-shaped member.

The first electrical contact surfaces 213 are positioned on one end of the IC substrate 212 in the second direction. The first electrical contact surfaces 213 include four thin plate-like electrodes. The first electrical contact surfaces 213 are electrically connected to the developing memory 211. In a state where the developing cartridge 10 is attached to the printer body, the first electrical contact surfaces 213 are parallel to the third direction. The first electrical contact surfaces 213 can move, relative to the housing 11, in the first, second, and third directions.

<IC Chip Holder 24>

The IC chip holder 24 is an example of a "storage medium holder." As illustrated in FIG. 1, the IC chip holder 24 is positioned at the one end of the housing 11 in the first direction. As illustrated in FIG. 2, the IC chip holder 24 is positioned between the developing roller 12 and the first handle 113 in the third direction. As illustrated in FIG. 4, at least a portion of the IC chip holder 24 overlaps the large-diameter gear 147 in the first direction. In other words, at least a portion of the IC chip holder 24 is positioned in an area in which the large-diameter gear 147 is projected in the first direction. As illustrated in FIG. 4, the IC chip holder 24 is positioned between the first outer surface 115 and the second outer surface 116 of the housing 11 in the second direction.

The IC chip holder 24 holds the first electrical contact surfaces 213 by holding the IC substrate 212. As illustrated in FIG. 6, the IC chip holder 24 has a first outer surface 413 positioned on one end thereof in the second direction. The first outer surface 413 has a recessed shape into which the IC substrate 212 can be inserted. The IC substrate 212 is affixed to the first outer surface 413 with an adhesive material, for example. The first outer surface 413 can retain the IC chip 21. In other words, the first outer surface 413 can hold the developing memory 211 and first electrical contact surfaces 213 by holding the IC chip 21.

<Holder Cover 25>

As illustrated in FIG. 1, the holder cover 25 is positioned at the one end of the gear cover 18 in the first direction. The holder cover 25 has a generally square cylindrical shape that, together with the gear cover 18, surrounds the IC chip holder 24. As illustrated in FIG. 5, the holder cover 25 has a U-shape that surrounds one end of the IC chip holder 24 in the first direction, one end of the IC chip holder 24 in the third direction, and another end of the IC chip holder 24 in the third direction. The holder cover 25 holds the IC chip holder 24. The IC chip holder 24 is movable, relative to the holder cover 25, in the first, second, and third directions.

As illustrated in FIG. 5, the holder cover 25 has a first plate part 251. The first plate part 251 is positioned away from the gear cover 18 toward the one side in the first direction. The IC chip holder 24 is positioned between the first plate part 251 and the gear cover 18 in the first direction.

As illustrated in FIG. 5, the holder cover 25 is mounted on the gear cover 18 by a first screw 253. The first screw 253 is inserted into a first screw hole 61 (see FIG. 13) of the gear cover 18 and a second screw hole 62 (see FIG. 11) of the holder cover 25 from an inner surface of the gear cover 18 in the first direction toward an outer surface of the gear cover 18 in the first direction. The holder cover 25 may also be mounted on the gear cover 18 with two or more first screws 253.

As illustrated in FIGS. 2 and 5, the holder cover 25 has a first through-hole 254. As illustrated in FIG. 5, the gear cover 18 has a second through-hole 255, and a third through-hole 256. The first through-hole 254 is positioned in the first plate part 251. The first through-hole 254 extends toward the one side in the second direction as extending toward the one side in the third direction. The second through-hole 255 and third through-hole 256 may have the same shape as the first through-hole 2540, or a different shape from the first through-hole 254.

The IC chip holder 24 is movable relative to the housing 11. The first electrical contact surfaces 213 retained by the IC chip holder 24 are also movable relative to the housing 11. The IC chip holder 24 is movable relative to the gear cover 18.

As illustrated in FIG. 6, the IC chip holder 24 has a first boss 411, a second boss 412, and a third boss 417. The first boss 411, second boss 412, and third boss 417 extend in the first direction. The first boss 411 is positioned at the one end of the IC chip holder 24 in the first direction. The second boss 412 and third boss 417 are positioned at another end of the IC chip holder 24 in the first direction. The third boss 417 is positioned apart from the second boss 412 toward the one side in the second direction. The first boss 411 is positioned between the second boss 412 and the third boss 417 in the second direction.

The first boss 411 is loosely inserted in the first through-hole 254. The second boss 412 is loosely inserted in the second through-hole 255. The third boss 417 is loosely inserted in the third through-hole 256. As illustrated in FIG. 2, the first through-hole 254 has a size in the second direction that is larger than a size in the second direction of the first boss 411. When the IC chip holder 24 moves relative to the holder cover 25 in the second direction, the first boss 411 moves in the second direction within the first through-hole 254. The second through-hole 255 has a size in the second direction that is larger than a size in the second direction of the second boss 412. When the IC chip holder 24 moves relative to the holder cover 25 in the second direction, the second boss 412 moves in the second direction within the second through-hole 255.

As illustrated in FIG. 2, the first through-hole 254 also extends in the third direction. The first through-hole 254 has a size in the third direction that is larger than a size in the third direction of the first boss 411. When the IC chip holder 24 moves relative to the holder cover 25 in the third direction, the first boss 411 moves in the third direction within the first through-hole 254. Since the first boss 411 can move in the third direction within the first through-hole 254, the IC chip holder 24 can move in the third direction relative to the housing 11.

Incidentally, the first through-hole 254 may be in a form of a recess in which an end of the first boss 411 can be inserted. Likewise, the second through-hole 255 may be in a form of a recess in which an end of the second boss 412 can be inserted. Further, the third through-hole 256 may also be in a form of a recess in which an end of the third boss 417 can be inserted.

As illustrated in FIG. 6, the IC chip holder 24 has a holder groove 414. The holder groove 414 is positioned at the one end of the IC chip holder 24 in the second direction. The IC chip holder 24 has a holder protrusion 415. The holder protrusion 415 is positioned apart from the first outer surface 413 in the first direction. The holder groove 414 is positioned between the first outer surface 413 and the holder protrusion 415 in the first direction.

As illustrated in FIGS. 6 and 7, the IC chip holder 24 has a first holder 41, and a second holder 42. The second holder 42 is positioned apart from the first holder 41 on the other side of the first holder 41 in the second direction. The first outer surface 413 is positioned on the one end of the first holder 41 in the second direction. The first holder 41 has a cylindrical part 416. The cylindrical part 416 is positioned on the other end of the first holder 41 in the second direction. The cylindrical part 416 has a square tubular shape that is elongated in the second direction. The first holder 41 also has a part extending from the cylindrical part 416 toward the one side in the second direction. This part of the first holder 41 has the first outer surface 413 holding the IC chip 21.

As illustrated in FIGS. 6 and 7, the second holder 42 has a body portion 421, a pawl 422, and protrusions 423 and 424. As illustrated in FIG. 7, the body portion 421 extends in the second direction. The body portion 421 has a square tubular shape. The body portion 421 has a bottom. The bottom is positioned at the other side of the body portion 421 in the second direction. The body portion 421 is inserted inside the cylindrical part 416. The second holder 42 is movable relative to the first holder 41 in the second direction. As illustrated in FIG. 6, a tip end of the pawl 422 is inserted in a through-hole formed in the cylindrical part 416 of the first holder 41. Accordingly, the second holder 42 is configured not to come off relative to the first holder 41.

The protrusions 423 and 424 protrude from another end in the second direction of the body portion 421 toward the other side in the second direction. The protrusion 424 is positioned apart from the protrusion 423 toward the other side in the first direction. In other words, the protrusion 424 is positioned closer to the one end of the housing 11 in the first direction than the protrusion 423 is to the other end of the IC chip 21. The protrusion 424 is positioned closer to the gear cover 18 in the first direction than the protrusion 423 is to the gear cover 18. The protrusion 423 has a curved surface 426. The protrusion 424 has a curved surface 427. The curved surface 427 is positioned on the other side of the curved surface 426 in the first direction.

The curved surface 427 is positioned apart from the curved surface 426 toward the other side in the first direction. In other words, the curved surface 427 is positioned closer to the one end of the housing 11 in the first direction than the curved surface 426 is to the one end of the housing 11. The curved surface 427 is positioned closer to the gear cover 18 in the first direction than the curved surface 426 is to the gear cover 18. The curved surfaces 426 and 427 constitute a second outer surface 425. The second outer surface 425 is positioned on the other end of the IC chip holder 24 in the second direction. The second outer surface 425 has a holder groove 428. The holder groove 428 is positioned between the curved surface 426 and the curved surface 427 in the first direction.

<Resilient Member 45>

As illustrated in FIGS. 6 and 7, the IC chip holder 24 includes a resilient member 45. The resilient member 45 is positioned between the first holder 41 and second holder 42 in the second direction. The resilient member 45 is positioned between the first outer surface 413 and second outer surface 425. The resilient member 45 is a coil spring, for example.

As illustrated in FIG. 7, the resilient member 45 is positioned inside the cylindrical part 416 of the first holder 41 and inside the body portion 421 of the second holder 42. The resilient member 45 has one end in the second direction that is in contact with the first holder 41. The resilient member 45 has another end in the second direction that is in contact with the second holder 42.

The resilient member 45 can expand and contract in the second direction. As the resilient member 45 expands and contracts, the IC chip holder 24 expands and contracts in the second direction. When the IC chip holder 24 contracts in the second direction, the resilient member 45 contracts in the second direction, thereby generating a resilient force (a restoring force). Through this resilient force, the resilient member 45 urges the second holder 42 in a direction away from the first holder 41 (toward the other side) in the second direction.

By the resilient force of the resilient member 45, the IC chip holder 24 can bring the first electrical contact surface 213 into good contact with a device-side electrical contact in the printer body when the developing cartridge 10 is attached to the printer body.

<Recycling of the Developing Cartridge 10>

Figure 8:
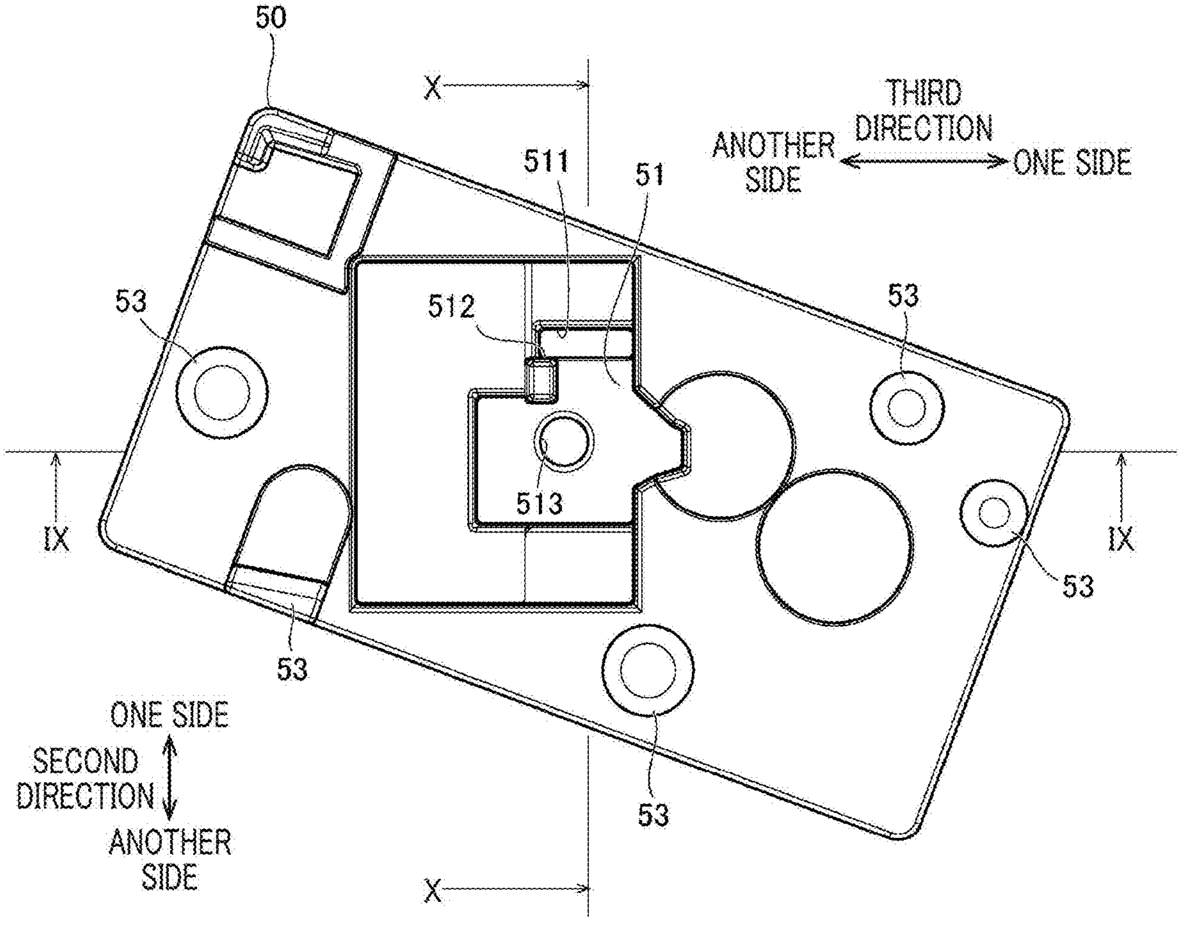
FIG. 8 is a side view of a jig according to the embodiment.
Figure 9:
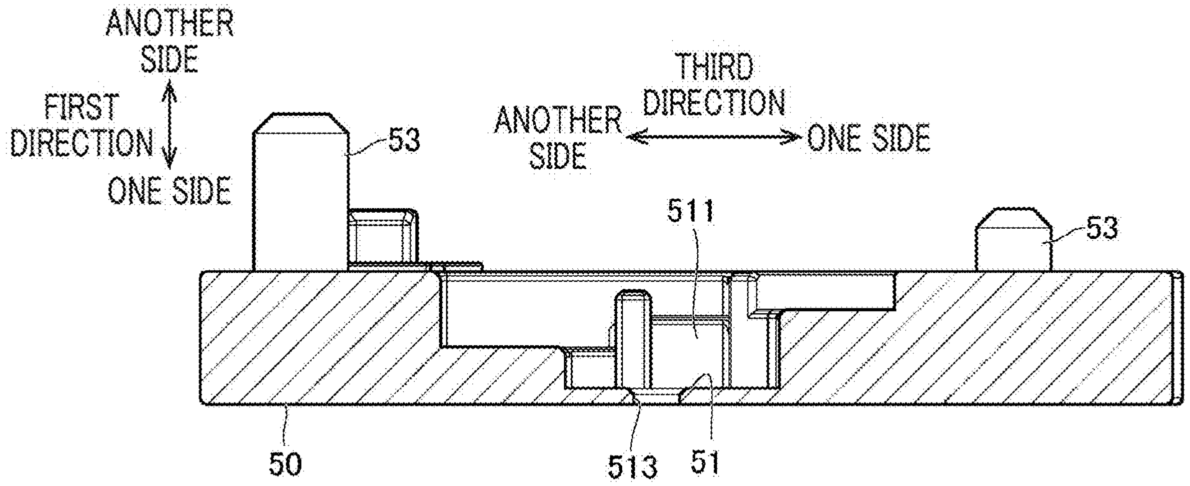
FIG. 9 is a cross-sectional view of the jig taken along a line IX-IX shown in FIG. 8.
Figure 10:
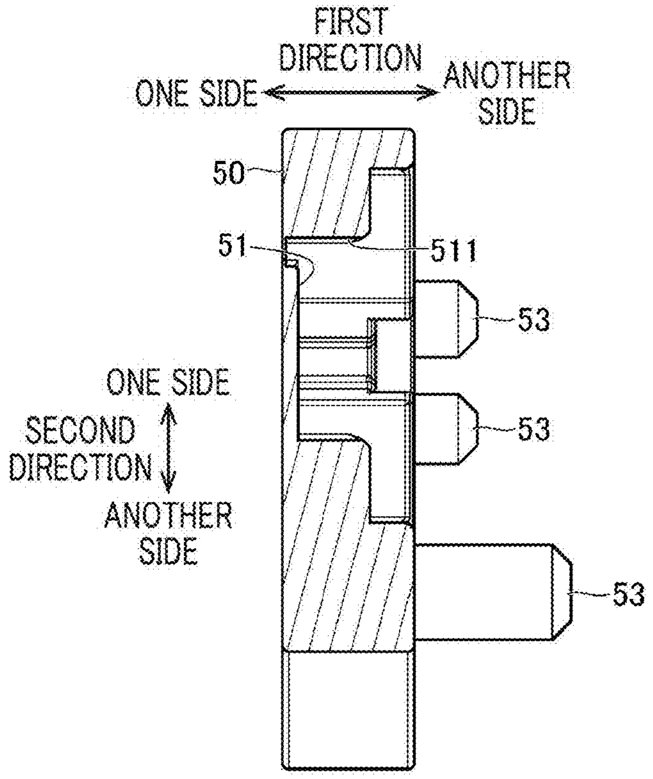
FIG. 10 is a cross-sectional view of the jig taken along a line X-X shown in FIG. 8.
Figure 11:
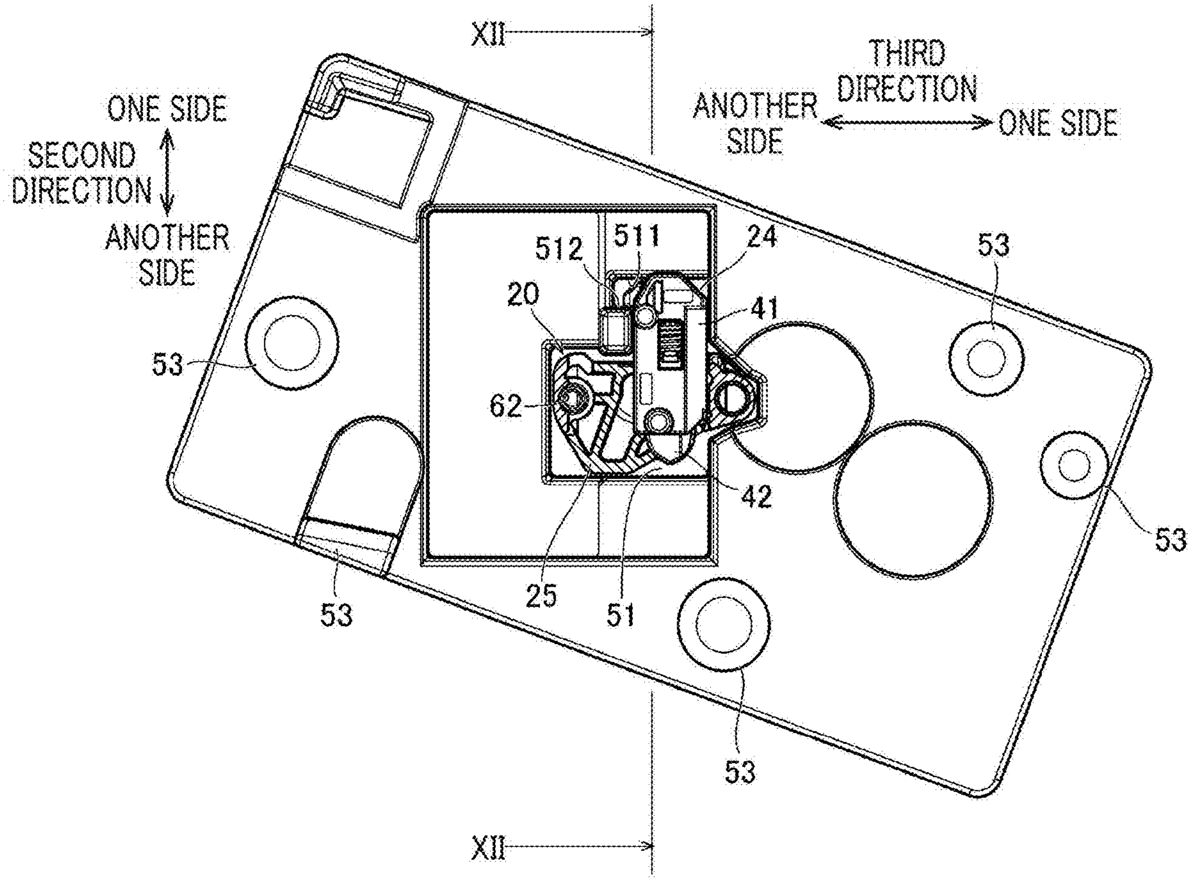
FIG. 11 illustrates the jig with a holder assembly mounted thereon.
Figure 12:
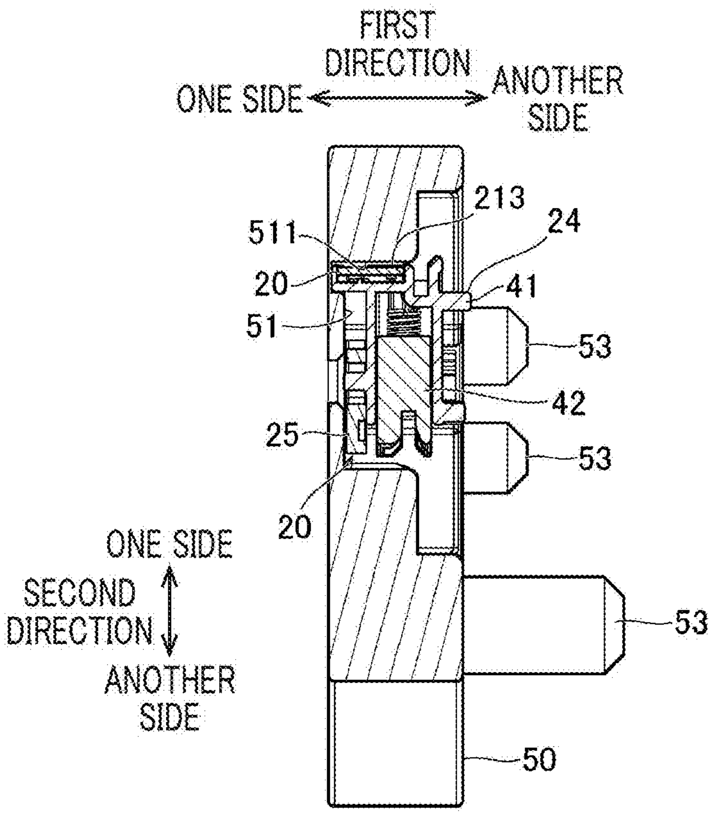
FIG. 12 is a cross-sectional view of the jig taken along a line XII-XII shown in FIG. 11.
Figure 13:
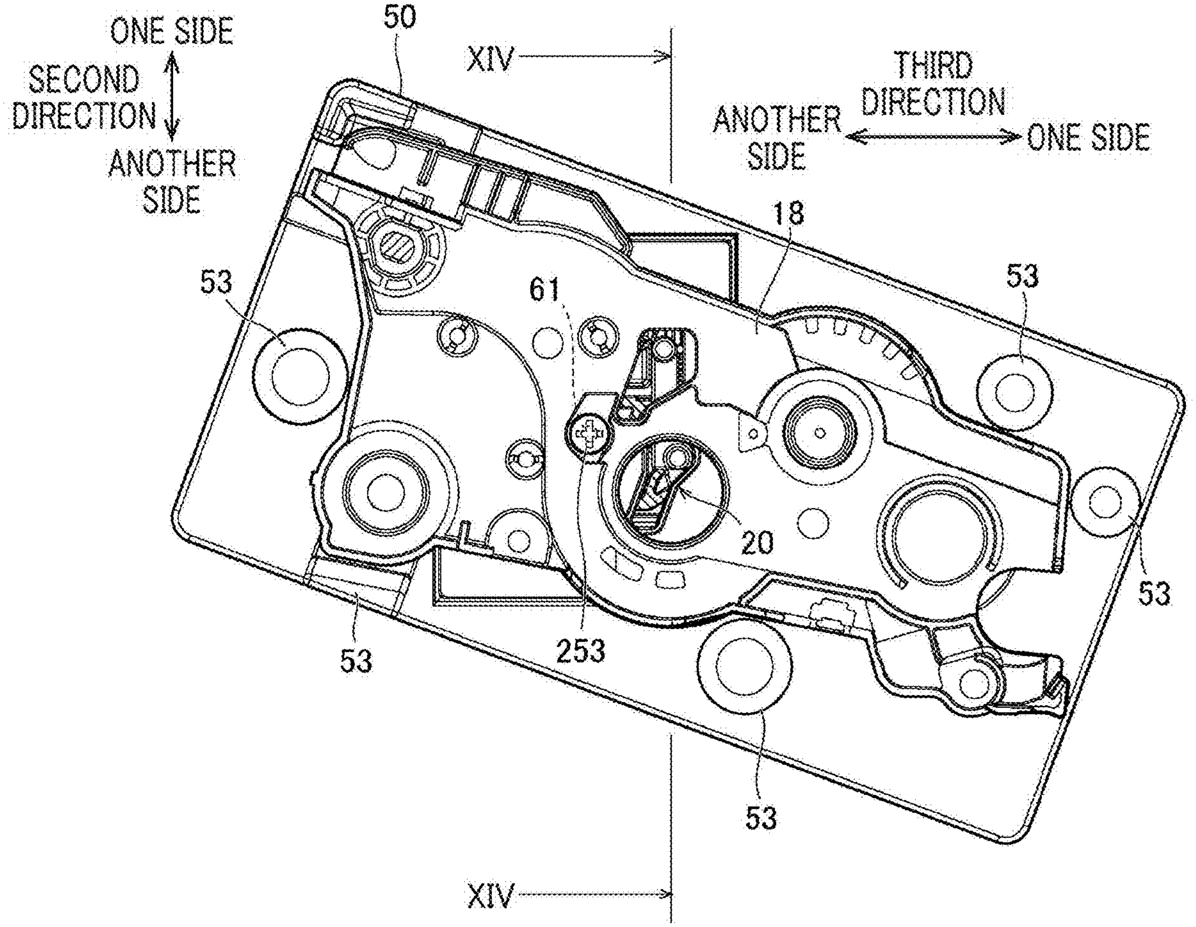
FIG. 13 is a side view of the jig with the gear cover and holder assembly mounted thereon.
Figure 14:
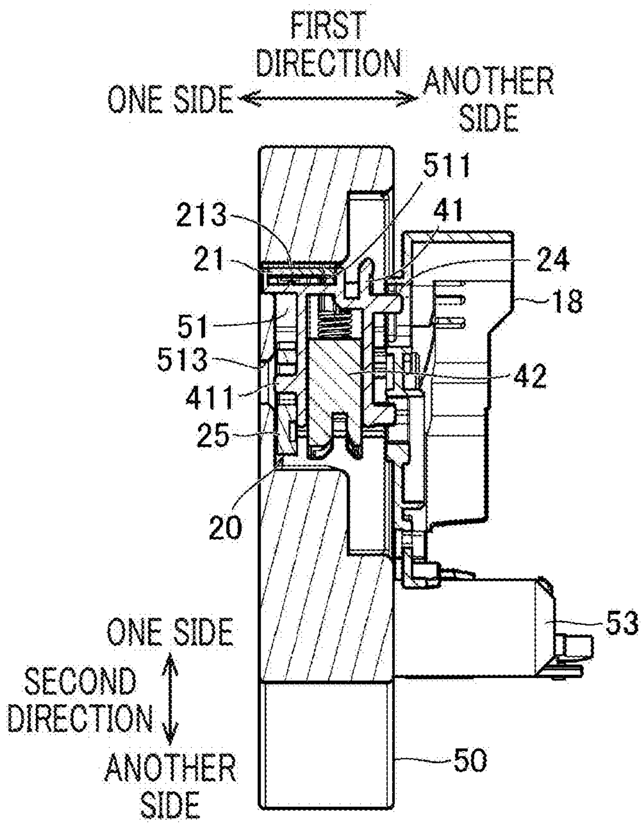
FIG. 14 is a cross-sectional view of the jig, holder assembly, and gear cover taken along a line XIV-XIV shown in FIG. 13.

FIG. 8 is a side view of a jig 50 according to the embodiment. FIG. 9 is a cross-sectional view of the jig 50 taken along a line IX-IX shown in FIG. 8. FIG. 10 is a cross-sectional view of the jig 50 taken along a line X-X shown in FIG. 8. FIG. 11 shows the jig 50 with the holder assembly 20 mounted thereon. FIG. 12 is a cross-sectional view of the jig 50 taken along a line XII-XII shown in FIG. 11. FIG. 13 is a side view of the jig 50 with the gear cover 18 and holder assembly 20 mounted thereon. FIG. 14 is a cross-sectional view of the jig 50, holder assembly 20, and gear cover 18 taken along a line XIV-XIV shown in FIG. 13.

The jig 50 is used in a process of removing the holder assembly 20 mounted on the gear cover 18 from the gear cover 18 and in a process of mounting the holder assembly 20 on the gear cover 18. As illustrated in FIGS. 8 through 10, the jig 50 has a first recess 51, and a plurality of protrusions 53.

<First Recess 51>

The first recess 51 is recessed toward the one side in the first direction. As illustrated in FIGS. 11 and 12, the holder assembly 20 alone (for example, a new holder assembly 20) can be inserted into the first recess 51. Further, as illustrated in FIGS. 13 and 14, the holder assembly 20 mounted on the gear cover 18 can be inserted into the first recess 51.

The first recess 51 has a first inner surface 511, and a second inner surface 512. As illustrated in FIGS. 8 and 11, the second inner surface 512 is positioned apart from the first inner surface 511 in the second direction. The second inner surface 512 is positioned on the other side of the first inner surface 511 to be separated apart therefrom in the second direction. As illustrated in FIGS. 11 and 12, the first inner surface 511 contacts one end of a part of the first holder 41 in the second direction (the part extending from the cylindrical part 416 and holding the IC chip 21) when the holder assembly 20 is positioned in the first recess 51. Further, as illustrated in FIG. 11, the second inner surface 512 contacts another end of the part of the first holder 41 in the second direction. Since the first inner surface 511 and second inner surface 512 contact the first holder 41, the first holder 41 is suppressed from moving in the second direction.

As illustrated in FIG. 11, when the holder assembly 20 is positioned in the first recess 51, both the one end and the other end of the first holder 41 in the third direction contact inner surfaces of the first recess 51, thereby suppressing the first holder 41 from moving in the third direction within the first recess 51.

As illustrated in FIG. 11, the inner surfaces of the first recess 51 are shaped to conform to an outer profile of the holder cover 25. When the holder assembly 20 is positioned in the first recess 51, outer surfaces of the holder cover 25 contacts the inner surfaces of the first recess 51, whereby the holder cover 25 is immovably mounted on the jig 50.

When the holder assembly 20 is mounted on the jig 50, as illustrated in FIG. 12, the first electrical contact surfaces 213 held by the first holder 41 are positioned apart from the first inner surface 511. As such, the first electrical contact surfaces 213 are restrained from rubbing against the jig 50.

When the holder assembly 20 is mounted in the jig 50, as illustrated in FIGS. 11 and 12, the second holder 42 is positioned apart from the inner surfaces of the first recess 51 in the second direction. Since the second holder 42 is positioned apart from the jig 50 in the second direction, the holder assembly 20 can be easily mounted on the jig 50.

As illustrated in FIGS. 8, 9, and 14, the jig 50 has a through-hole 513. The through-hole 513 penetrates through the jig 50 in the first direction. The through-hole 513 is located within the first recess 51. When the holder assembly 20 is positioned inside the first recess 51, as illustrated in FIG. 14, a tip end of the first boss 411 of the first holder 41 is positioned inside the through-hole 513. The through-hole 513 has an inner diameter that is larger than an outer diameter of the first boss 411. Hence, the first boss 411 is restricted from making contact with the jig 50.

<Protrusions 53>

As illustrated in FIG. 8, the jig 50 has five protrusions 53. The five protrusions 53 extend in the first direction. As illustrated in FIGS. 13 and 14, when the gear cover 18 is mounted on the jig 50, an outer peripheral surface of the gear cover 18 is in contact with the five protrusions 53. Due to the contact of the gear cover 18 with the protrusions 53, the gear cover 18 can be fixed in position relative to the jig 50 in the second direction or in the third direction. Further, the gear cover 18 is restrained from moving relative to the jig 50 in the second direction or in the third direction.

Four of the five protrusions 53 have a columnar shape that extends in the first direction. Contact surfaces of the four protrusions 53 that contact the outer peripheral surface of the gear cover 18 are curved. Hence, the gear cover 18 can be suppressed from being damaged as a result of contact between the outer peripheral surface of the gear cover 18 and the respective contact surfaces of the four protrusions 53.

<Recycling Procedure for the Developing Cartridge 10>

Figure 15:
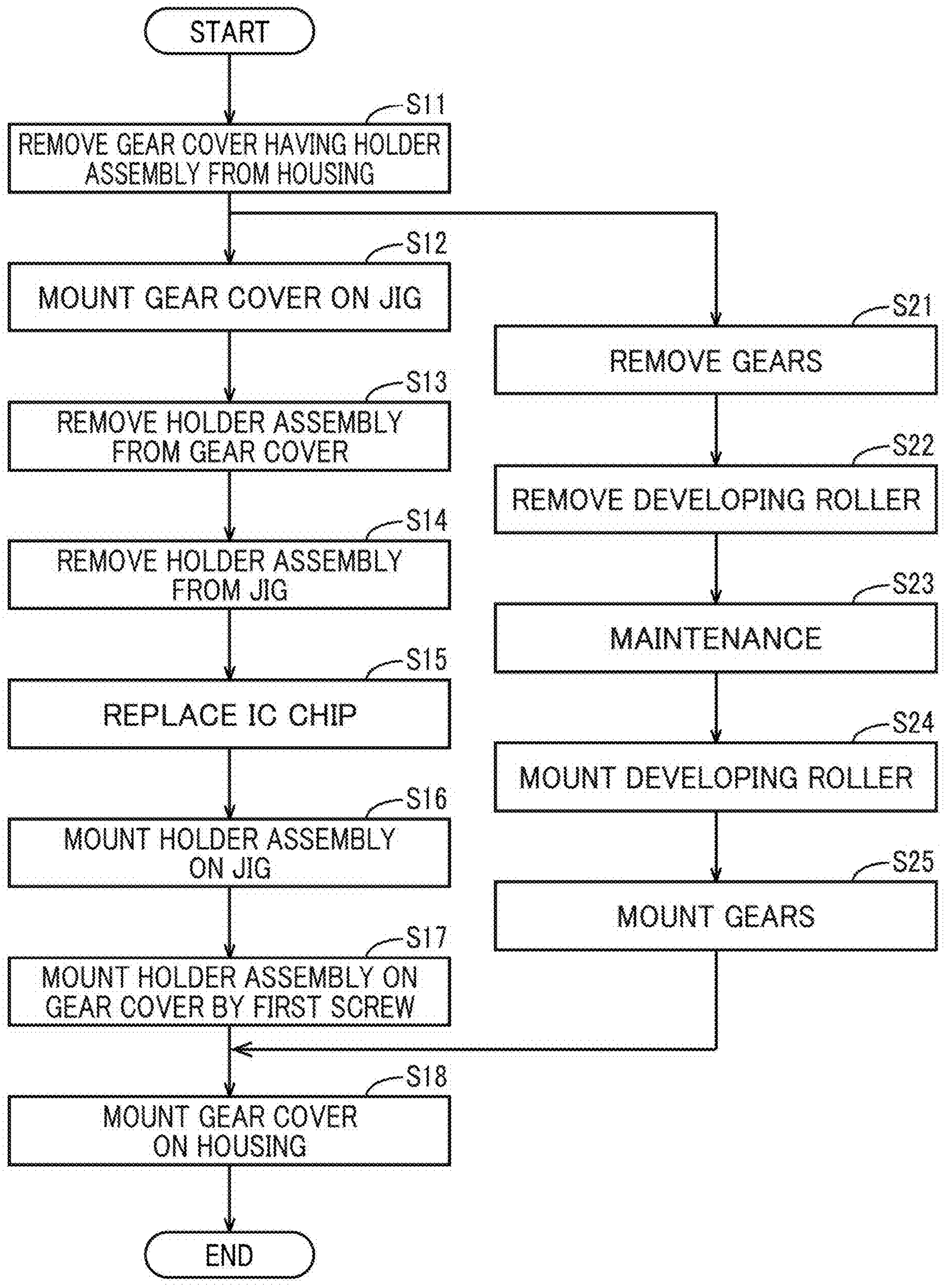
FIG. 15 is a flowchart illustrating a procedure for recycling the developing cartridge using the jig.

FIG. 15 is a flowchart illustrating steps in a recycling procedure for the developing cartridge 10 using the jig 50. The recycling procedure illustrated in FIG. 15 includes a procedure for replacing the holder assembly 20 (steps S12-S17), and a procedure for replacing the gears and the developing roller 12 (steps S21-S25).

To recycle the developing cartridge 10, first, the gear cover 18 is removed from the housing 11 of the developing cartridge 10 (step S11). For example, in a case where the gear cover 18 is fixed to the housing 11 with screws, the gear cover 18 is removed from the housing 11 after the screws are removed.

Following step S11, the gear cover 18 is mounted on the jig 50 (step S12). Specifically, the holder assembly 20 mounted on the gear cover 18 is placed inside the first recess 51 of the jig 50, as illustrated in FIGS. 13 and 14. Inside the first recess 51, the one end of the first holder 41 in the holder assembly 20 contacts the first inner surface 511 of the first recess 51 while the other end of the first holder 41 contacts the second inner surface 512 of the first recess 51 (see FIG. 8). Hence, the first holder 41 is restricted from moving in the second direction relative to the jig 50. Further, the outer peripheral surface of the gear cover 18 contacts the five protrusions 53, whereby the gear cover 18 is restrained from moving in the second direction relative to the jig 50.

Following step S12, the holder assembly 20 is removed from the gear cover 18 (step S13). As illustrated in FIG. 13, the holder assembly 20 and gear cover 18 are assembled together by the first screw 253. In step S12, the holder assembly 20 is removed from the gear cover 18 by removing the first screw 253.

As illustrated in FIG. 13, the gear cover 18 has the first screw hole 61 in which the first screw 253 can be inserted. As illustrated in FIG. 11, the holder cover 25 of the holder assembly 20 has the second screw hole 62 in which the first screw 253 can be inserted. When the holder assembly 20 is mounted on the gear cover 18, the first screw 253 is inserted into the first screw hole 61 and second screw hole 62 from the inner surface of the gear cover 18 in the first direction toward the outer surface of the gear cover 18 in the first direction. The IC chip holder 24 is assembled to the gear cover 18 through the holder cover 25 with the first screw 253.

Even if a clamping force of the first screw 253 is diminished due to deformation of the second screw hole 62 of the holder cover 25 or the like, this can be addressed by replacing the holder cover 25. Replacing the holder cover 25 can reduce the number of times the IC chip holder 24 is to be replaced, thereby reducing the cost of recycling the developing cartridge 10.

In step S12, the holder assembly 20 is positioned in the first recess 51 of the jig 50. Therefore, the operator is less likely to contact the first electrical contact surfaces 213 of the IC chip 21 in the holder assembly 20 when removing the holder assembly 20 from the gear cover 18 in step S13. Accordingly, the IC chip 21 can be protected.

Further, since the holder assembly 20 is positioned inside the first recess 51 of the jig 50 in step S12, the gear cover 18 can be mounted on the jig 50 even in a state where the holder assembly 20 protrudes from the gear cover 18.

Further, since the holder assembly 20 is mounted on the jig 50 in step S12, the first holder 41 and gear cover 18 are restricted from moving relative to the jig 50. Accordingly, the first screw 253 can be easily removed in step S13, thereby facilitating the operation for removing the gear cover 18.

Figure 16:
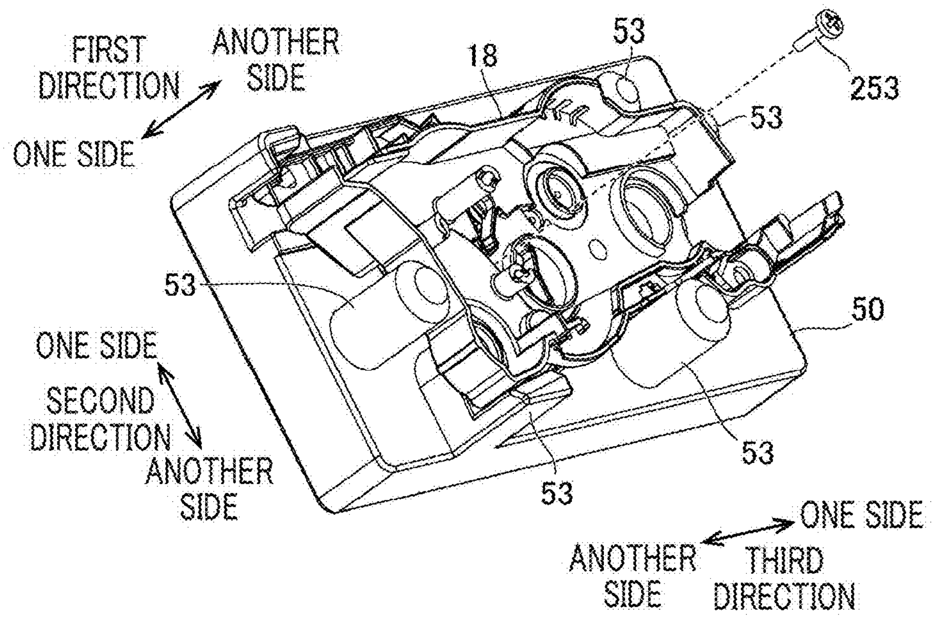
FIG. 16 is a perspective view illustrating how the gear cover is removed from the holder assembly.
Figure 16:
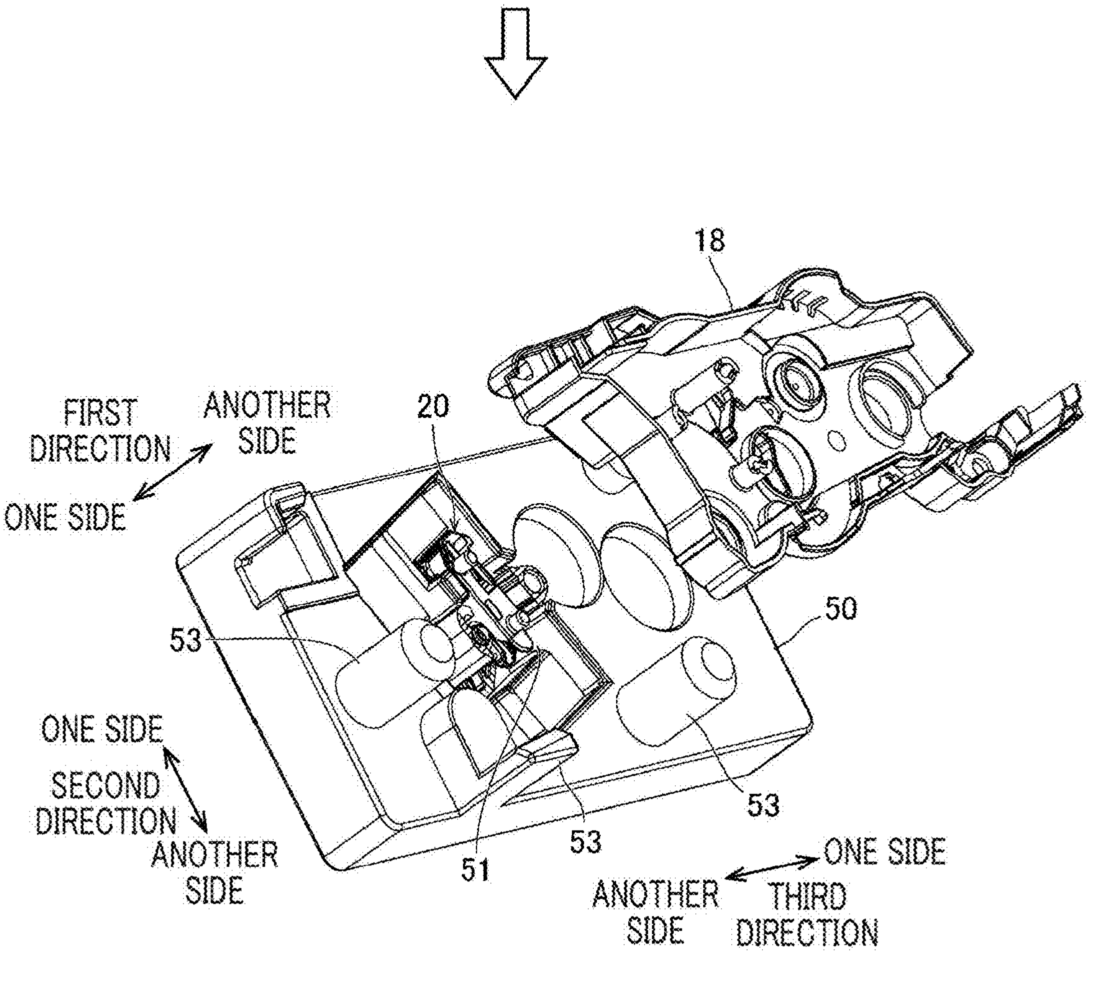

FIG. 16 is a perspective view illustrating how the gear cover 18 is removed from the holder assembly 20. As illustrated in FIG. 16, after the first screw 253 is removed, the gear cover 18 is separated from the jig 50 toward the other side in the first direction. As a result, the gear cover 18 is removed from the holder assembly 20 and the jig 50 while leaving the holder assembly 20 in the first recess 51 of the jig 50.

Returning to FIG. 15, following step S13, the holder assembly 20 is removed from the first recess 51 of the jig 50 (step S14).

Following step S14, the IC chip 21 held in the holder assembly 20 that was removed from the first recess 51 is replaced with a new or recycled IC chip 21 (step S15). A new IC chip 21 is a newly manufactured IC chip 21 that has not yet been used. A recycled IC chip 21 is a used IC chip 21, such as an IC chip 21 that has had information stored in the developing memory 211 updated. In step S15, the holder assembly 20 with the replaced IC chip 21 differs from the holder assembly 20 that was removed from the gear cover 18 in step S13. The holder assembly 20 having the replaced IC chip 21 is an example of “another holder assembly.”

Incidentally, the IC chip holder 24 of the holder assembly 20 may be replaced with a new or recycled IC chip holder 24 in step S15. Similarly, the holder cover 25 of the holder assembly 20 may be replaced with a new or recycled holder cover 25. Further, the IC chip 21, IC chip holder 24, and holder cover 25 may be replaced with new or recycled products.

Following step S15, the holder assembly 20 is placed inside the first recess 51 of the jig 50 (step S16). When the holder assembly 20 is positioned in the first recess 51, as illustrated in FIGS. 11 and 12, the one end in the second direction of the part of the first holder 41 contacts the first inner surface 511 while the other end in the second direction of the part of the first holder 41 contacts the second inner surface 512, whereby the IC chip holder 24 is mounted on the jig 50 so as to be immovable relative thereto.

Figure 17:
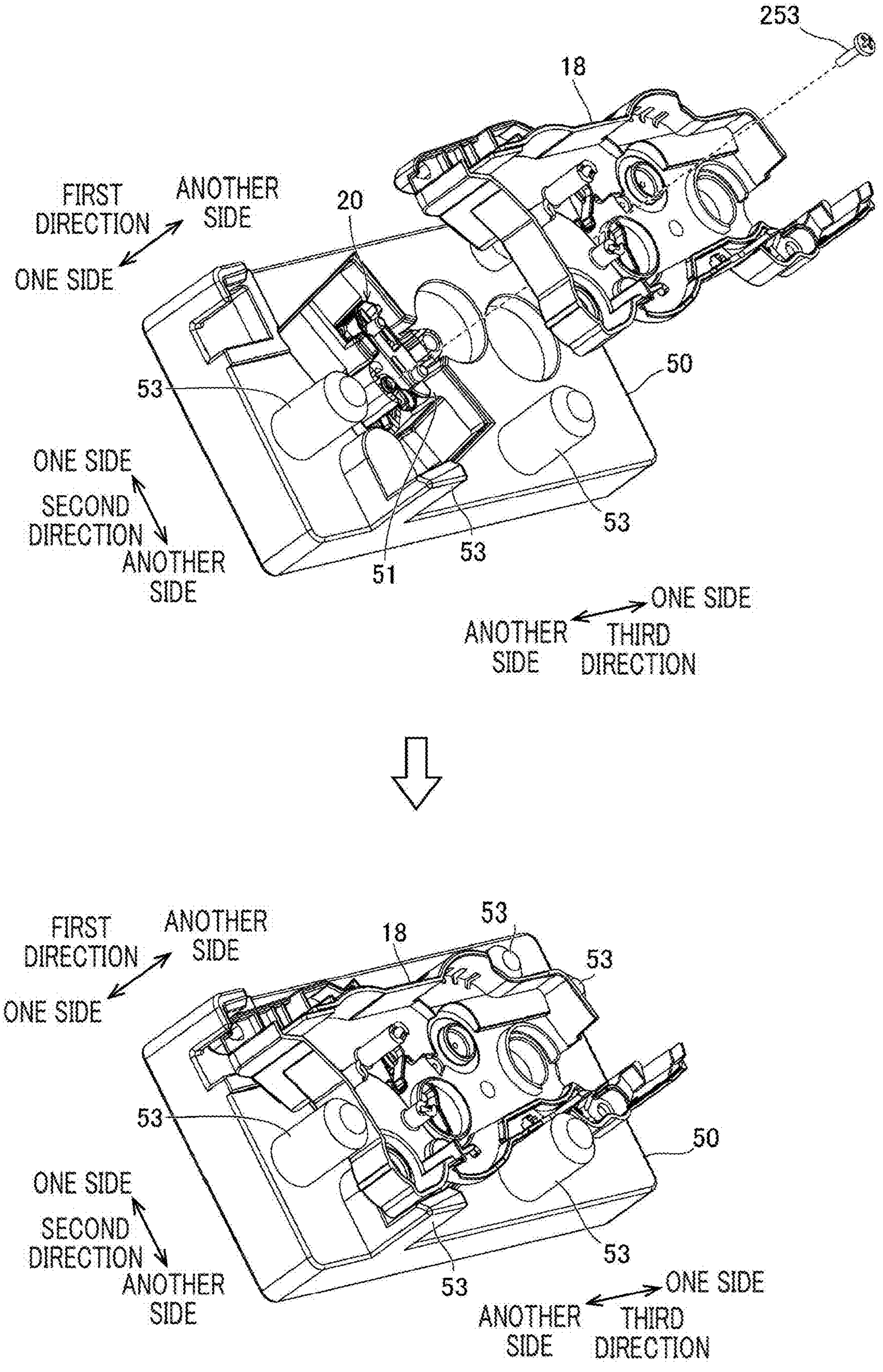
FIG. 17 is a perspective view illustrating how a new or recycled holder assembly is fixed to the gear cover.

Following step S16, the holder assembly 20 is mounted on the gear cover 18 with the first screw 253 (step S17). FIG. 17 is a perspective view illustrating how a new or recycled holder assembly 20 is mounted on the gear cover 18. As illustrated in FIG. 17, the gear cover 18 is mounted on the jig 50 in step S17. At this time, the gear cover 18 is positioned on the other side of the holder assembly 20 in the first direction. The holder assembly 20 is then mounted on the gear cover 18 on the inner surface thereof with the first screw 253.

The gear cover 18 is mounted on the jig 50 in step S17 while the holder assembly 20 is mounted on the jig 50. Accordingly, the operator can be restrained from contacting the first electrical contact surfaces 213 of the IC chip 21 in the holder assembly 20 while mounting the holder assembly 20 on the gear cover 18 in step S17. Thus, the IC chip 21 can be protected.

Moreover, in step S17, the IC chip holder 24 of the holder assembly 20 is immovably mounted on the jig 50 and the gear cover 18 is immovably mounted on the jig 50. Therefore, the IC chip holder 24 and holder cover 25 can be fixed in position relative to the gear cover 18. In other words, the position of the first screw hole 61 formed in the gear cover 18 and the position of the second screw hole 62 formed in the holder cover 25 can be aligned with each other. A such, the gear cover 18 and holder assembly 20 can be easily mounted on each other with the first screw 253.

<Replacement Procedure for the Gears and the Developing Roller 12>

Returning to FIG. 15, following step S11, the gears are removed from the developing cartridge 10 (step S21). The gears include the developing roller gear 123, supply roller gear 133, first idle gear 171, second idle gear 172, third idle gear 173, first agitator gear 145, and second agitator gear 155. Through the process of step S21, the gears coupled to the developing roller 12 are removed.

Following step S21, the developing roller 12 is removed from the developing cartridge 10 (step S22). Following step S22, maintenance is performed (step S23). Specifically, cleaning on the developing roller 12 is performed in step S23. In step S23, a thickness regulating blade may also be cleaned or replaced. The thickness regulating blade is a member for making the toner deposited on the surface of the developing roller 12 into a uniform layer. A toner seal may also be replaced in step S23. The toner seal is a member that suppresses leakage of toner from the housing 11 of an unused developing cartridge 10.

Following step S23, the developing roller 12 is mounted on the housing 11 (step S24). The developing roller 12 that is mounted on the housing 11 may be the developing roller 12 that was removed in step S22 and cleaned in step S23. Alternatively, the developing roller 12 may be a new or recycled developing roller 12.

Following step S24, the gears are mounted on the housing 11 (step S25). Incidentally, the gears mounted in step S25 may be new or recycled gears.

Following step S17 and step S25, the gear cover 18 having the holder assembly 20 mounted thereon is mounted on the housing 11 (step S18). This completes the process of recycling the holder assembly 20.

As described above, the jig 50 is used for removing the holder assembly 20 (step S13) and for mounting the holder assembly 20 (step S17). This configuration can refrain the operator from contacting the first electrical contact surfaces 213 of the IC chip 21 in the holder assembly 20. Therefore, the IC chip 21 can be suitably protected in recycling of the developing cartridge 10.

2. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, while the first recess 51 has a bottom, as illustrated in FIG. 8, the first recess 51 may be formed as a through-hole without a bottom.

The number of the protrusions 53 is not limited to five, but may be four or less, or six or more.

What is claimed is:

1. A method of recycling a developing cartridge, the developing cartridge including: a housing configured to store developer therein and extending in a longitudinal direction; a gear cover positioned at one end of the housing in the longitudinal direction; a holder assembly; and a first screw for mounting the holder assembly on the gear cover, wherein the holder assembly includes: a storage medium; a storage medium holder holding the storage medium, the storage medium holder being movable relative to the housing and the gear cover; and a holder cover holding the storage medium holder, the method comprising:

a gear cover removing step of removing the gear cover having the holder assembly mounted thereon with the first screw from the housing;

a screw removing step of removing, after the gear cover removing step, the first screw from the gear cover;

a holder assembly removing step of removing, after the screw removing step, the holder assembly from the gear cover;

a first gear cover mounting step of mounting, after the holder assembly removing step, the gear cover on a jig in a first direction in a state where another holder assembly different from the removed holder assembly is mounted on the jig, the another holder assembly including another storage medium holder and another holder cover;

a holder assembly mounting step of mounting, after the first gear cover mounting step, the another holder assembly on the gear cover with the first screw; and a second gear cover mounting step of mounting, after the holder assembly mounting step, the gear cover having the another holder assembly mounted thereon with the first screw on the housing, wherein, in the first gear cover mounting step, the another storage medium holder of the another holder assembly is restricted from moving relative to the jig and the another holder cover of the another holder assembly in a state where the another holder assembly is mounted on the jig.

2. The method according to claim 1, wherein, in the first gear cover mounting step, the another storage medium holder of the another holder assembly is immovable relative to the jig and the another holder cover of the another holder assembly in the state where the another holder assembly is mounted on the jig.

3. The method according to claim 1, wherein the another holder assembly further includes:

another storage medium different from the storage medium of the holder assembly, wherein the another storage medium holder holds the another storage medium, the another storage medium holder being different from the storage medium holder of the removed holder assembly, wherein the another holder cover holds the another storage medium holder, the another holder cover being different from the holder cover of the removed holder assembly, and wherein, in the first gear cover mounting step, the another storage medium holder is immovably mounted on the jig.

4. The method according to claim 1, wherein the jig has a first recess that is recessed in the first direction, and wherein, in the first gear cover mounting step, the another holder assembly is mounted in the first recess.

5. The method according to claim 1, wherein the jig has a plurality of protrusions extending in the first direction, wherein the gear cover has a peripheral wall defining a contour of the gear cover, and wherein, in the first gear cover mounting step, the peripheral wall of the gear cover contacts the plurality of protrusions.

6. The method according to claim 1, wherein the gear cover has a first screw hole in which the first screw can be inserted, wherein the holder cover has a second screw hole in which the first screw can be inserted, and wherein, in the holder assembly mounting step, the first screw is inserted into both the first screw hole and the second screw hole from an inner surface of the gear cover in the first direction toward an outer surface of the gear cover in the first direction.

7. The method according to claim 1, further comprising:

a third gear cover mounting step of mounting, after the gear cover removing step and before the screw removing step, the gear cover on the jig in the first direction, wherein the storage medium holder comprises:

a first holder holding the storage medium;

a second holder positioned apart from the first holder in a second direction crossing the first direction; and a resilient member positioned between the first holder and the second holder and configured to expand and contract in the second direction, wherein the jig has:

a first inner surface; and a second inner surface positioned apart from the first inner surface in the second direction, wherein the first holder has a part holding the storage medium, and wherein, in a state where the holder assembly is mounted on the jig, one end portion of the part of the first holder in the second direction contacts the first inner surface, and another end portion of the part of the first holder in the second direction contacts the second inner surface.

8. The method according to claim 7, wherein the storage medium has an electrical contact surface, and wherein the electrical contact surface is positioned apart from the first inner surface in the state where the holder assembly is mounted on the jig.

9. The method according to claim 8, wherein the second holder has one end portion and another end portion in the second direction, and wherein, in the state where the holder assembly is mounted on the jig, the another end portion in the second direction of the second holder is positioned apart from the jig in the second direction.

10. The method according to claim 1, wherein the developing cartridge further comprises a developing roller rotatable about a developing roller axis extending in the first direction, the method further comprising:

a developing roller removing step of removing, after the gear cover removing step, the developing roller from the housing; and a developing roller mounting step of mounting, after the developing roller removing step, another developing roller different from the removed developing roller on the housing.

11. The method according to claim 1, wherein the developing cartridge further comprises:

an agitator rotatable about an agitator axis extending in the first direction; and an agitator gear rotatable about the agitator axis together with the agitator, the method further comprising:

an agitator gear removing step of removing, after the gear cover removing step, the agitator gear from the housing; and an agitator gear mounting step of mounting, after the agitator gear removing step, another agitator gear different from the removed agitator gear on the housing.

* * * * *